United States Patent
Mills et al.

(10) Patent No.: US 8,545,922 B1
(45) Date of Patent: Oct. 1, 2013

(54) METHOD FOR REDUCING MICROBIAL CONTAMINATION FOR POULTRY

(75) Inventors: David J. Mills, Barron, WI (US);
Michael J. Benson, New London, MN (US); Steven D. Leitch, Willmar, MN (US); Lachelle R Venenga, Willmar, MN (US)

(73) Assignee: Hormel Foods Corporation, Austin, MN (US)

( * ) Notice: Subject to any disclaimer, the term of this patent is extended or adjusted under 35 U.S.C. 154(b) by 734 days.

(21) Appl. No.: 11/697,828

(22) Filed: Apr. 9, 2007

(51) Int. Cl.
*A23L 1/315* (2006.01)
*A23L 1/31* (2006.01)
*A23B 4/08* (2006.01)
*A23B 4/02* (2006.01)

(52) U.S. Cl.
CPC ............ *A23L 1/3152* (2013.01); *A23L 1/3155* (2013.01); *A23B 4/08* (2013.01); *A23B 4/02* (2013.01)
USPC .......................................... 426/644; 426/332

(58) Field of Classification Search
CPC .... A23L 1/3152; A23L 1/3155; A22C 21/00; A23B 4/20
USPC .............................................. 426/644, 332
See application file for complete search history.

(56) References Cited

U.S. PATENT DOCUMENTS

| 2,208,645 A | 7/1940 | Savrda |
| 2,571,544 A * | 10/1951 | Cutrera ..................... 452/106 |
| 3,668,738 A | 6/1972 | Vertegaal |
| 4,091,503 A | 5/1978 | Fox et al. |
| 4,184,230 A | 1/1980 | Fox et al. |
| 4,528,720 A | 7/1985 | Young et al. |
| 4,574,427 A | 3/1986 | Harben, Jr. et al. |
| 5,431,939 A * | 7/1995 | Cox et al. ...................... 426/300 |
| 2004/0265445 A1 * | 12/2004 | Liimatta ....................... 426/332 |
| 2004/0265446 A1 | 12/2004 | McNaughton |

OTHER PUBLICATIONS

Harbaugh, E. et al., Rapid Aerosol Transmission of *Salmonella* among Turkeys in a Simulated Holding-shed Environment, Pountry Sci. 85, 1693-1699, 2006.*

Wong, M. K., et al., Moisture, total lipid, fatty acids and cholesterol in raw ground turkey, J. Agri. Food. Chem. 1993, 41, 1229-1231.*

* cited by examiner

*Primary Examiner* — Donald Tarazano
*Assistant Examiner* — Jerry W Anderson
(74) *Attorney, Agent, or Firm* — IPLM Group, P.A.

(57) ABSTRACT

A method of reducing pathogenic bacteria in the neck of poultry is provided. The method includes opening up a neck of a poultry (20) and rupturing cervical air sacs (12). The exposed, ruptured cervical air sacs are treated with an antibacterial agent, thereby reducing pathogenic bacteria.

19 Claims, 2 Drawing Sheets

METHOD FOR REDUCING MICROBIAL CONTAMINATION FOR POULTRY

BACKGROUND OF THE INVENTION

1. Field of the Invention

This invention relates generally to a method of reducing microbial contamination for poultry and more particularly to a method of processing the neck of poultry to provide for more effective microbial contamination reduction.

2. Description of the Prior Art

Poultry is susceptible to having microbial contamination. During the processing of the poultry, the poultry processors make effort to reduce the microbial contamination. While the following will be discussed in particular with respect to turkeys and turkey necks, it is also understood that it is also applicable to other poultry.

Reducing food bourn pathogenic bacteria, especially salmonella, in processed turkey is a goal of the industry and the USDA. The amount of salmonella that is typically found in a turkey will vary, depending upon the time of year, the flock from which the turkey was taken, and other variables. During the processing of the turkey, the outside of the turkey carcass is brought in contact with various antimicrobial agents. This will usually effectively reduce the amount of salmonella on the surface of the turkey. Turkey necks are generally removed from the whole bird during evisceration and chilled separate from the whole bird. The neck chiller is typically treated with an antimicrobial chemical to treat the surface of the neck, however, when turkey necks are later ground, it has been found that a high percentage of the ground neck samples still contain salmonella.

The USDA performance standard for ground turkey allows for up to 49.9% of the samples taken to contain salmonella. The test is either a positive or a negative. Also, the USDA has established criteria that would categorize a plant based upon how it performs in relation to the performance standard. According to the regulation—"Grouping establishments across all product classes into one of three categories based on the two most recent Salmonella set sample results is another new initiative. Category 1 includes establishments whose two most recent Salmonella set results are equal to or less than 50% of the performance standard. The Agency considers these establishments to demonstrate consistent process control. Category 2 includes establishments who have at least one of their most recent two sample set results at greater than 50% of the performance standards without exceeding it. The Agency considers these establishments to have variable process control. Category 3 includes establishments whose most recent Salmonella set result has exceeded the performance standard for its product class. The Agency considers these establishments to display highly variable process control." Of course it is desirable for a plant to be known as a consistent process control plant.

The present invention addresses the problems associated with the prior art methods and provides for a more effective method for reducing pathogen bacteria in poultry necks.

SUMMARY OF THE INVENTION

In one embodiment, the invention is a method of reducing pathogenic bacteria in a neck of poultry having cervical vertebrae. The method includes opening up a neck of a poultry to expose cervical air sacs in the neck. The cervical air sacs are ruptured. The exposed, ruptured cervical air sacs are treated with an antibacterial agent, thereby reducing pathogenetic bacteria.

In another embodiment, the invention is a method of reducing salmonella contamination in ground turkey neck meat. The method includes longitudinally splitting a turkey neck sufficiently to expose and rupture cervical air sacs in the turkey neck. The exposed, ruptured cervical air sacs are treated with an antibacterial agent, thereby reducing salmonella contamination. The neck of the poultry is ground after being treated with the antibacterial agent to produce ground turkey neck meat.

In another embodiment, the invention is a method of reducing pathogenetic bacteria in ground poultry neck meat. The method includes mechanically opening up a neck of a poultry sufficiently to provide effective rupturing of cervical air sacs in the neck of a poultry. The ruptured cervical air sacs are treated with an antibacterial agent, thereby reducing pathogenetic bacteria. The neck of the poultry is ground after being treated. The mechanical opening leaving the poultry neck of a size that, after treating and grinding, the moisture content of the ground poultry neck is 80% or less.

DETAILED DESCRIPTION OF A PREFERRED EMBODIMENT

As discussed in the description of the prior art, the reduction of microbial contamination in poultry, and especially turkey necks, has been of concern for processors. The rinsing of the outside of the turkeys with an antibacterial agent was helpful in reducing salmonella but did not reduce the incidences of salmonella sufficiently enough. Once a turkey neck is ground, pathogenic bacteria remain a concern. The Applicants have discovered that the cervical air sacs in the neck harbor some level of pathogens that could not be reached by treating the outside of the neck. Further, by simply reducing the neck in size, i.e., cutting a turkey neck by a plurality of latitudinal (perpendicular to the spinal cord) cuts, did not show a significant pathogen reduction. It was found that in order to effectively expose the air sacs in the neck, the neck is preferably split longitudinal (parallel to the spinal cord). The splitting of a neck in this manner, followed by chemical treatment, showed significant reduction in pathogenic bacteria. It should be noted that use of the term "grinding" or "ground" with respect to the turkey neck does not involve the grinding up of the meat and the bones. Instead, this is a recognized term in the art and refers to the separation of the meat on the turkey neck from the bone or cartilage. A suitable mechanical meat/bone separator such as POSS separator may be used for the continuous mechanical meat/bone separation.

It is of course understood that other separators besides a POSS separator may be used to separate the meat from the bone in a turkey neck.

Figure 1:
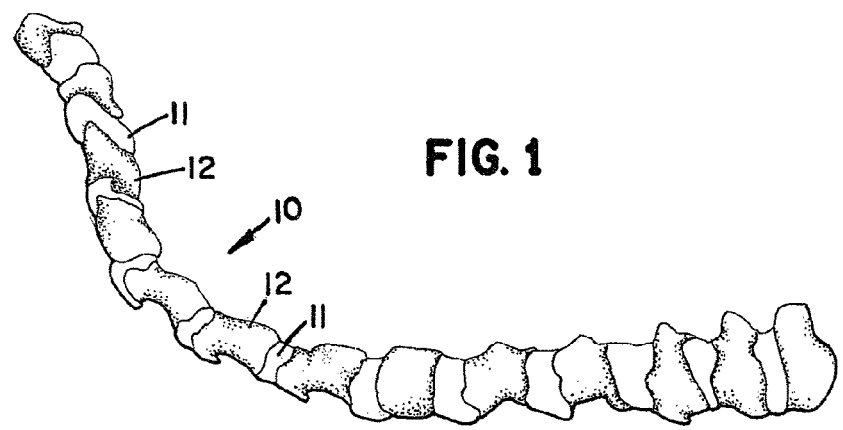
FIG. 1 is a drawing of the internal portions of a turkey neck.

Referring to the drawings, wherein like numerals represent like parts throughout the several views, there is shown in FIG. 1 a drawings of the internal portions of a turkey neck, designated 10. The turkey neck has a plurality of vertebrae 11. Between the vertebrae is a plurality of cervical air sacs 12. These air sacs are actually clear membranes and are difficult to depict in a drawing, although it is understood that such a structure of a turkey neck is well known in the art and this is being shown for illustrative purposes only.

Figure 2:
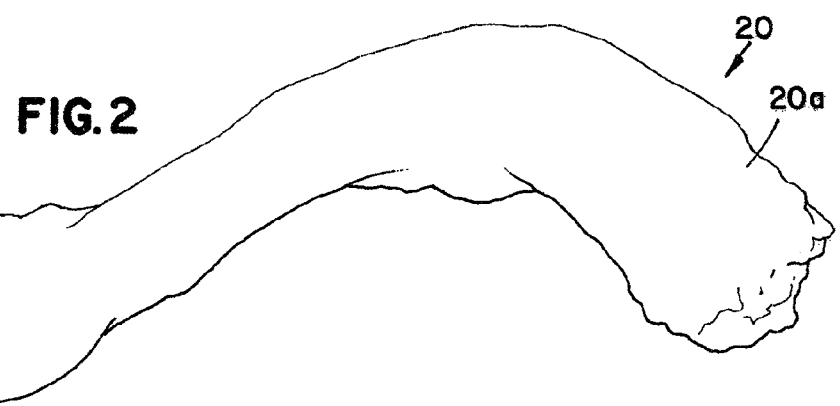
FIG. 2 is a perspective drawing of a turkey neck.
Figure 3:
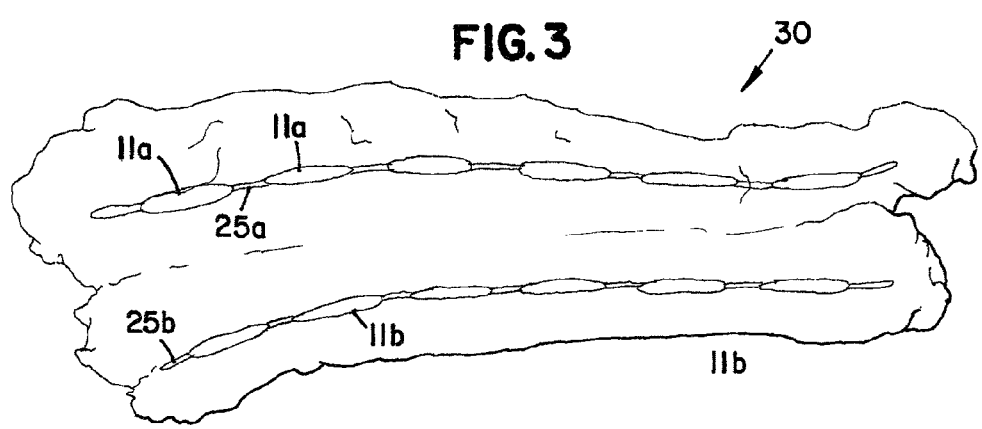
FIG. 3 is a perspective drawing of a turkey neck after the turkey neck has been split longitudinally.
Figure 4:
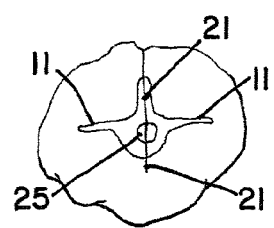
FIG. 4 is a cross-sectional view taken generally along the lines 4-4 of FIG. 2.
Figure 5:
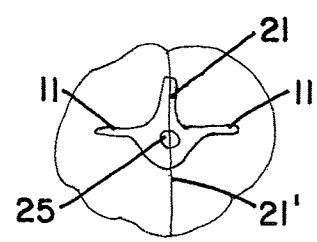
FIG. 5 is a cross-sectional view, similar to FIG. 4, showing a different cut through the neck.

Referring now to FIGS. 2-3, there is shown a turkey neck 20 that is referred to as a turkey neck. The turkey neck is elongate and generally circular with a curve, forming a general J shape. The turkey neck is thicker at its base 20a. FIG. 4 shows a cross-section of the turkey neck 20. In the general center of the turkey neck 20 is an spinal cord 25. The cervical air sacs are located along the spinal cord 25 between each of the cervical vertebrae. In order to slice the turkey neck, a cut is made along a line 21. The resultant longitudinal cut along the line 21 for the entire length of the turkey neck results in a split turkey neck as shown in FIG. 3. The split turkey neck 30 may still be in one piece, each vertebrae into a first half 11a and a second half 11b, or it may be cut completely in two. If the cut is directly down the middle, the spinal cord 25 will be cut into two halves 25a and 25b, as shown in FIG. 3. It is, however, preferred the cut goes completely through the cervical vertebrae and far enough into the meat on the opposite site to allow the neck to lay out flat much like a butterfly pork chop. If the cut is too shallow, the meat will shrink during cooling and the slit tends to close back up. Closing of the slit reduces the expose of the ruptured air sac to the chemical treatment. The cut along the line 21 may be made by hand with a knife or it could be automated. FIG. 4 shows the cut 21 going completely through the vertebrae 11 and into the meat on the opposite side. This results in what is shown in FIG. 3, that is, the neck is still in one piece. FIG. 5 shows the cut 21' going completely through the neck, which results in the neck being split in two pieces.

The first example shows tests that were run over 21 days from April 10-Jun. 1, 2006. During this period of time, the flocks will typically have more exposure to bacteria. For both the whole necks and split necks, 2,000 pounds of necks were run through a neck chiller. The neck chiller water was treated with an acidified chlorine solution. The pH was controlled at 6.5 and an ORP (oxidation reduction potential) controller was used meter in the chlorine. The ORP control setpoint was 600-650 mv. It is understood that any suitable antibacterial agent may be used, such as acidified sodium chlorite, peroxyacetic acid, Cetylpyridinium chloride (CPC) to name a few examples. Both the whole necks and the split necks were in the neck chiller for 45 minutes. The split necks were slit longitudinally, as shown in FIGS. 3 and 4. They were chilled to a temperature of less than 40°. As the necks exited the chiller, the split necks were separated from the whole necks. The split necks were then run through a clean large POSS separator followed by the whole necks to separate the meat from the bone. The POSS machine was set up with 0.020 inch screens. Ten samples were taken of the ground meat from the whole necks and ten samples of the ground meat from the split necks. The table shows the average moisture content as well as the log of the total plate count (TPC), which reflects all bacteria. After the eleventh test, they no longer collected TPC and moisture content as there was no significant difference. For the 10 samples of each test that were randomly pulled, the percent of salmonella positive incidences is shown. For instance, in the first test, it can be seen that the whole neck had a 70% result. This means that 7 out of the 10 samples were positive for salmonella. This is contrasted to the split neck where the percent positive was zero. Of the total 210 samples for each, the whole necks had an average of 58.57% positive for Salmonella and the split necks had an average of 38.57% positive for Salmonella. This represents a 34% reduction in the Salmonella incident rate for the split necks as compared to the whole necks.

| | WHOLE NECKS ORP | | | SPLIT NECKS ORP | | |
|---|---|---|---|---|---|---|
| Date | Average Moisture | LOG Total Plate Count | % Salm Positive | Average Moisture | LOG Total Plate Count | % Salm Positive |
| 4/10 | 77.51 | 3.36 | 70.00% | 77.99 | 3.46 | 0.00% |
| 4/17 | 79.11 | 3.98 | 30.00% | 78.93 | 3.93 | 10.00% |
| 4/18 | 77.29 | 3.82 | 30.00% | 76.34 | 3.77 | 10.00% |
| 4/21 | 77.41 | 3.74 | 70.00% | 76.84 | 3.52 | 40.00% |
| 4/24 | 75.50 | 3.31 | 0.00% | 78.06 | 3.56 | 20.00% |
| 4/25 | 76.71 | 3.44 | 0.00% | 77.85 | 3.45 | 0.00% |
| 4/26 | 77.48 | 3.62 | 0.00% | 78.70 | 3.36 | 0.00% |
| 4/27 | 80.12 | 4.09 | 60.00% | 81.26 | 3.66 | 30.00% |
| 4/28 | 77.42 | 3.72 | 50.00% | 77.51 | 3.46 | 20.00% |
| 4/29 | 79.34 | 4.00 | 100.00% | 79.56 | 3.53 | 80.00% |
| 4/30 | 75.97 | 4.12 | 100.00% | 76.20 | 3.68 | 100.00% |
| 5/11 | | | 100.00% | | | 90.00% |
| 5/12 | | | 100.00% | | | 90.00% |
| 5/15 | | | 100.00% | | | 100.00% |
| 5/16 | | | 0.00% | | | 0.00% |
| 5/22 | | | 0.00% | | | 10.00% |
| 5/24 | | | 100.00% | | | 60.00% |
| 5/25 | | | 80.00% | | | 30.00% |
| 5/30 | | | 90.00% | | | 0.00% |
| 5/31 | | | 50.00% | | | 40.00% |
| 6/01 | | | 100.00% | | | 80.00% |
| Averages | | | 58.57% | | | 38.57% |
| Ttest Whole vs. Split Necks = | | | 0.001156337 | | | |

| Date | Whole ORP | Whole Neck ORP with Sanova™ | Split ORP | Split Neck ORP with Sanova™ |
|---|---|---|---|---|
| Jul. 10, 2006 | 10.00% | 0.00% | 0.00% | 0.00% |
| Jul. 12, 2006 | 30.00% | 10.00% | 10.00% | 0.00% |
| Jul. 14, 2006 | 10.00% | 0.00% | 0.00% | 0.00% |
| Jul. 24, 2006 | 30.00% | 20.00% | 10.00% | 0.00% |
| Jul. 25, 2006 | 10.00% | 0.00% | 10.00% | 0.00% |
| Jul. 26, 2006 | 60.00% | 10.00% | 10.00% | 0.00% |
| Jul. 27, 2006 | 50.00% | 40.00% | 30.00% | 30.00% |
| Averages | 28.57% | 11.43% | 10.00% | 4.29% |

Ttest Whole Neck W/ORP vs. Split Necks W/ORP = 0.01026
Ttest Whole Neck W/Sanova vs. Split Necks W/Sanova = 0.02326

The second example was run under the same conditions with respect to example 1. However, the dates of these seven tests were from Jul. 10-27, 2006, a time where the salmonella is typically less prevalent. Again, it can be seen that the average Salmonella incident rate with the split neck was 10% as opposed to 28.57% for the whole neck. This shows a 65% reduction in incident rate by splitting the necks. This second example also shows a comparison between whole necks and split necks with an added secondary treatment. After the neck chiller and before the grinding, both the whole necks and split necks were run through a 12 second dip in Sanova™, an antibacterial agent of Ecolab Inc. of St. Paul, Minn. This resulted in a reduction of Salmonella. Even in these tests, the split necks averaged a 4.29% occurrence contrasted to the 11.43% occurrence for the whole necks, or a reduction of 62%.

As previously discussed, it has been found that simply cutting the neck into smaller segments such as 1" length does not result in as effective treatment. It is necessary to effectively fracture the air sacs. While it is understood that cutting up the turkey neck without a longitudinal slitting may be also utilized, as long as there is effective fracturing of the air sacs, the turkey neck must not be cut too much or else the overall quality of the product is compromised. For instance, if the turkey neck is ground, (i.e., the meat separated from the bone) and is quite small, the treatment with the antibacterial agent will result in the meat picking up too much moisture and it will not function as a normal ground turkey product. A typical moisture content of ground turkey meat that is acceptable is between 75-80%. Much above 80% the product is no longer appealing to the consumer.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of reducing pathogenic bacteria in ground neck meat of poultry having a cervical vertebrae, the method comprising:
   (a) opening up a neck of a poultry to expose cervical air sacs in the neck;
   (b) splitting the cervical vertebrae;
   (c) rupturing the cervical air sacs;
   (d) treating the exposed, ruptured cervical air sacs with an antibacterial agent, thereby reducing pathogenic bacteria; and
   (e) grinding the neck of the poultry after being treated.

2. The method of claim 1, wherein the poultry is a turkey.

3. The method of claim 1, wherein the opening and rupturing is by longitudinally splitting the turkey neck.

4. The method of claim 3, wherein the splitting is deep enough to go completely through the cervical vertebrae to expose and rupture the air sacs and still leave the turkey neck as a single piece.

5. The method of claim 3, wherein the splitting is deep enough to go completely through the neck and split the neck into two parts.

6. The method of claim 1, wherein the bacteria is salmonella.

7. The method of claim 1, wherein the splitting of the cervical vertebrae is longitudinal.

8. The method of claim 1, wherein the grinding is by use of a mechanical meat/bone separator.

9. A method of reducing salmonella contamination in ground turkey neck meat, the method comprising:
   (a) longitudinally splitting a turkey neck sufficiently to expose and rupture cervical air sacs in the turkey neck;
   (b) treating the exposed, ruptured cervical air sacs with an antibacterial agent, thereby reducing salmonella contamination; and
   (c) grinding the neck of the poultry after being treated with the antibacterial agent to produce ground turkey neck meat.

10. The method of claim 9, further comprising the ground turkey meat having a moisture content of 80% or less.

11. The method of claim 10, further comprising leaving the turkey neck as a single piece after splitting.

12. The method of claim 9, wherein the grinding is by use of a mechanical meat/bone separator.

13. A method of reducing pathogenic bacteria in ground poultry neck meat, the method comprising:
   (a) mechanically opening up a neck of a poultry and splitting the cervical vertebrae sufficiently to provide effective rupturing of cervical air sacs in the neck of a poultry;
   (b) treating the ruptured cervical air sacs with an antibacterial agent, thereby reducing pathogenic bacteria;
   (c) grinding the neck of the poultry, after being treated,
   (d) the mechanically opening leaving the poultry neck of a size that, after treating and grinding, the moisture content of the ground poultry neck is 80% or less.

14. The method of claim 13, wherein the poultry is a turkey.

15. The method of claim 13, wherein the opening and rupturing is by longitudinally splitting the turkey neck.

16. The method of claim 13, wherein the splitting is deep enough to go completely through the cervical vertebrae to expose and rupture the air sacs and still leave the turkey neck as a single piece.

17. The method of claim 13, wherein the bacteria is salmonella.

18. The method of claim 13, wherein the splitting of the cervical vertebrae is longitudinal.

19. The method of claim 13, wherein the grinding is by use of a mechanical meat/bone separator.

* * * * *